United States Patent
Kimura

(10) Patent No.: US 6,781,637 B2
(45) Date of Patent: Aug. 24, 2004

(54) IMAGE CHANGE DETECTING APPARATUS AND IMAGE CHANGE DETECTING METHOD, IMAGE ENCODING APPARATUS AND INFORMATION RECORDING MEDIUM WITH IMAGE CHANGE DETECTING PROGRAM RECORDED READABLE BY COMPUTER

(75) Inventor: Tomohiro Kimura, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 721 days.

(21) Appl. No.: 09/805,361

(22) Filed: Mar. 14, 2001

(65) Prior Publication Data

US 2001/0022814 A1 Sep. 20, 2001

(30) Foreign Application Priority Data

Mar. 14, 2000 (JP) ..................................... P2000-076324

(51) Int. Cl.$^7$ ................................................ H04N 5/14
(52) U.S. Cl. .................................. 348/700; 375/240.16
(58) Field of Search ................................ 348/700, 701, 348/407.1, 405.1, 699; 375/240.16, 240.25, 240.12, 240.24

(56) References Cited

U.S. PATENT DOCUMENTS

| | | | |
|---|---|---|---|
| 4,689,673 A | 8/1987 | Ohki et al. ................. 358/136 |
| 5,592,226 A | * 1/1997 | Lee et al. ............... 375/240.14 |
| 5,815,217 A | 9/1998 | Kumazawa et al. ......... 348/700 |
| 5,872,598 A | 2/1999 | Legall et al. ................ 348/405 |
| 5,911,008 A | * 6/1999 | Niikura et al. .............. 382/236 |
| 5,978,029 A | 11/1999 | Boice et al. ................ 348/412 |
| 6,259,733 B1 | * 7/2001 | Kaye et al. .................. 375/240 |
| 6,301,301 B1 | * 10/2001 | Isu et al. ................ 375/240.14 |
| 6,385,386 B1 | 5/2002 | Aotake ......................... 386/68 |

FOREIGN PATENT DOCUMENTS

| | | |
|---|---|---|
| JP | 11-39850 | 2/1999 |
| JP | 11-242747 | 9/1999 |

* cited by examiner

Primary Examiner—Chris Kelley
Assistant Examiner—Behrozz Senfi
(74) Attorney, Agent, or Firm—Morgan, Lewis & Bockius LLP

(57) ABSTRACT

The present invention is to provide an image change detecting apparatus capable of detecting only a necessary scene change in encoding by the MPEG method accurately and certainly. The apparatus comprises an in-frame distribution value detecting part for detecting the in-frame distribution value in each frame image, a predicted error absolute value sum detecting part for detecting the predicted error absolute value sum in each frame image, and a host CPU for detecting whether or not a scene change occurs based on the change of the in-frame distribution values in each frame image of two consecutive frame images and the change of the predicted error absolute value sums at the boundary timing of the two frame images.

12 Claims, 6 Drawing Sheets

T1
(SCENE CHANGE)

T2
(SCENE CHANGE)

IMAGE CHANGE DETECTING APPARATUS AND IMAGE CHANGE DETECTING METHOD, IMAGE ENCODING APPARATUS AND INFORMATION RECORDING MEDIUM WITH IMAGE CHANGE DETECTING PROGRAM RECORDED READABLE BY COMPUTER

BACKGROUND OF THE INVENTION

1. Field of the Invention

The present invention relates to a technological field of an image change detecting apparatus and an image change detecting method, an image encoding apparatus and an information recording medium with an image change detecting program recorded readable by a computer. More specifically, it relates to a technological field of an image change detecting apparatus and an image change detecting method for detecting whether or not there occurs an image change (in general, referred to as a scene change), which takes place between two consecutive frame images as remarkable difference in image information amount included therein, an image encoding apparatus including the same, and an information recording medium with the image change detecting program recorded readable by a computer.

2. Description of the Related Art

In general, in the case of encoding (including compression encoding) of moving picture information comprising a plurality of frame images, the encoding parameter should be controlled optimally according to the characteristics of the moving picture information.

Here, as a method recently used commonly for the above-mentioned encoding method, the so-called MPEG (moving picture experts group) method can be presented.

This MPEG method is a kind of an encoding process using the so-called discrete cosine transform (DCT) method. These days, it is the international standard for high efficiency encoding (compression encoding) of the image information (including both moving picture information and still picture information).

In compression encoding of an image by the MPEG method, in general, an original image to be applied with compression encoding is divided into blocks called macro blocks as pixel blocks (including pixels comprising the original image by 16 pixels×16 pixels) so that movement compensation, the above-mentioned DCT, or a process such as binarization is carried out by the macro block unit.

In optimizing the movement compensation, the DCT, and the like at the time of encoding, in particular, the moving picture information, it is standardized in the MPEG method that the optimization is carried out by changing the parameter at the time of encoding (specifically, the quantization scale, the movement vector, or the like) with the in-frame distribution value per the above-mentioned macro block unit, or the like in the moving picture information to be encoded, provided as the key.

Here, the above-mentioned in-frame distribution value is the difference between the luminance in each pixel included in a frame image and the average value of the luminance in the frame image, in other words, the value representing to which extent the irregularity (distribution) of the luminance exists in each pixel in the frame image. That is, with a high in-frame distribution value, a frame image with full of variety as to the luminance is provided. In contrast, with a low in-frame distribution value, a monotonous frame image without variety is provided.

On the other hand, a so-called scene change in which there is a remarkable difference between two consecutive frame images in image information included therein may be included occasionally in the above-mentioned moving picture information to be encoded. In this case, the scene change corresponds visibly to the case of, for example, instantaneous change of the camera angle from an image including only the sky to an image including the woods.

At the time, among the above-mentioned scene changes, particularly in the case of a scene change from an image with a complicated configuration to an image with a monotonous configuration, it is necessary to detect the timing of the scene change, and set the parameter suited for the monotonous image after the detection of the timing. In the case the monotonous image is encoded with the parameter suited for the high compression for the complicated image maintained without the setting, a process for decoding the encoded moving picture for reproduction thereof causes problems that various noises may be included in the reproduced moving picture to the corresponding period immediately after the scene change.

In this regard, as a method for detecting the scene change in the conventional MPEG method, the in-frame distribution value in each frame image is always monitored for detecting whether or not the scene change occurs based on the change of the in-frame distribution values in two consecutive frame images (such a conventional scene change detecting method is disclosed for example, in Japanese Patent Application Laid-Open (JP-A) No. 11-242747 in detail.).

However, according to the conventional scene change detecting method, whether or not occurrence of the scene change is detected only in terms of the in-frame distribution value change. As a result, a scene change (that is, a scene change with a in-frame distribution value showing a change of more than a threshold value for a preset scene change detection but without the need of changing an encoding parameter (more specifically, the case of changing the camera angle from an image of a monotonous green woods to an image of a complicated green woods, or the like)) other than a scene change necessary in encoding (in other words, a scene change with the need of changing an encoding parameter) is also detected. As a result, the encoding parameter can be changed at a timing without the need of the change. In this case, the encoding efficiency is lowered so that effective encoding is disabled, and thus it is problematic.

SUMMARY OF THE INVENTION

Accordingly, in order to solve the above-mentioned problems, an object of the present invention is to provide an image change detecting apparatus and an image change detecting method capable of detecting only a necessary scene change in encoding by the MPEG method accurately and certainly, an image encoding apparatus including the same, and an information recording medium with the image change detecting program recorded readable by a computer.

In order to solve the above-mentioned problems, a first aspect of the present invention provides an image change detecting apparatus for detecting occurrence of an image change which takes place between two consecutive frame images as difference in image information amount included therein in moving picture information having a plurality of frame images, comprising: a distribution value detecting device for detecting each in-frame distribution value of the frame images, an absolute value sum detecting device for detecting each predicted error absolute value sum of the frame images, and an image change detecting device for detecting whether or not the image change takes place between the two frame images based on change between the in-frame distribution values of the two consecutive frame images and on change of the predicted error absolute value sums at boundary timing of the frame images.

Therefore, since whether or not occurrence of the image change is detected based on the change in the in-frame distribution values between two consecutive frame images and the change of the predicted error absolute value sums at the boundary timing, the image change influencing encoding can be detected certainly and accurately.

Accordingly, since the image change in the moving picture information can be detected certainly and accurately, an image process of encoding with the encoding parameter changed at the image change timing, or the like can be carried out.

In order to solve the above-mentioned problems, a second aspect of the present invention provides the image change detecting apparatus according to the first aspect, wherein the image change detecting device judges that the image change takes place between the two consecutive frame images when the in-frame distribution values of the frame images are larger than a preset value as well as the predicted error absolute value sums have an extreme value at the boundary timing of the two frame images.

Accordingly, since a judgement is made that the image change takes place between the two consecutive frame images when the in-frame distribution values of each of the frame images are larger than a set value as well as the predicted error absolute value sums have an extreme value at the boundary timing thereof, the image change can be detected further certainly and accurately.

In order to solve the above-mentioned problems, a third aspect of the present invention provides the image change detecting apparatus according to the second aspect, wherein the image change detecting device judges that the image change due to reduction in information amount takes place between the two consecutive frame images when the in-frame distribution value of a prior one of the frame images is larger than the in-frame distribution value of a latter one of the frame images.

Accordingly, the image change with the information amount reduced between the two consecutive images can be detected further certainly and accurately.

In order to solve the above-mentioned problems, a fourth aspect of the present invention provides the image change detecting apparatus according to the second aspect, wherein the image change detecting device judges that the image change due to increase in information amount takes place between the two consecutive frame images when the in-frame distribution value of a prior one of the frame images is smaller than the in-frame distribution value of the latter one of the frame images.

Accordingly, the image change with the information amount increased between the two consecutive images can be detected further certainly and accurately.

In order to solve the above-mentioned problems, a fifth aspect of the present invention provides an image encoding apparatus comprising: the image change detecting apparatus according to any one of first to fourth aspects, and an encoding device for encoding moving picture by changing an encoding parameter for encoding the moving picture information after occurrence of the image change is detected.

Accordingly, since the image change is detected certainly and the encoding parameter is changed at the image change timing, the moving picture information can be encoded further accurately with the noises reduced.

In order to solve the above-mentioned problems, a sixth aspect of the present invention provides an image change detecting method for detecting occurrence of an image change which takes place between two consecutive frame images as difference in image information amount included therein in moving picture information having a plurality of frame images, comprising: a distribution value detecting process for detecting each in-frame distribution value in the frame images, an absolute value sum detecting process for detecting each predicted error absolute value sum of the frame images, and an image change detecting process for detecting whether or not the image change takes place between the two frame images based on change between the in-frame distribution values of the two consecutive frame images and on change of the predicted error absolute value sums at boundary timing of the frame images.

Therefore, since whether or not occurrence of the image change is detected based on the change of the in-frame distribution values between two consecutive frame images and the change of the predicted error absolute value sums at the boundary timing, the image change influencing encoding can be detected certainly and accurately.

Accordingly, since the image change in the moving picture information can be detected certainly and accurately, an image process of encoding with the encoding parameter changed at the image change timing, or the like can be carried out.

In order to solve the above-mentioned problems, a seventh aspect of the present invention provides the image change detecting method according to the sixth aspect, wherein the image change detecting process judges that the image change takes place between the two consecutive frame images when the in-frame distribution values of the frame images are larger than a preset value as well as the predicted error absolute value sums have an extreme value at the boundary timing of the two frame images.

Accordingly, since generation of the image change between the two consecutive frame images is detected when the in-frame distribution values of each of the frame images are larger than a set value as well as the predicted error absolute value sums have an extreme value at the boundary timing thereof, the image change can be detected further certainly and accurately.

In order to solve the above-mentioned problems, an eighth aspect of the present invention provides an information recording medium with an image change detecting program recorded readable by a computer, wherein the program causes the computer, which is included in an image change detecting apparatus for detecting occurrence of an image change which takes place between two consecutive frame images as difference in image information amount included therein in moving picture information having a plurality of frame images, to function as: a distribution value detecting device for detecting each in-frame distribution value of the frame images; an absolute value sum detecting device for detecting each predicted error absolute value sum of the frame images; and an image change detecting device for detecting whether or not the image change takes place between the two frame images based on change between the in-frame distribution values of the two consecutive frame images and on change of the predicted error absolute value sums at boundary timing of the frame images.

Therefore, since the computer functions so as to detect whether or not the image change occurs based on the change of the in-frame distribution values between two consecutive frame images and the change of the predicted error absolute value sums at the boundary timing, the image change influencing encoding can be detected certainly and accurately.

Accordingly, since the image change in the moving picture information can be detected certainly and accurately, an image process of encoding with the encoding parameter changed at the image change timing, or the like can be carried out.

In order to solve the above-mentioned problems, a ninth aspect of the present invention provides the information recording medium with the image change detecting program recorded according to the eighth aspect, wherein the program causes the computer functioning as the image change detecting device to function to make a judgement that the image change takes place between the two consecutive frame images when the in-frame distribution values of the frame images are larger than a preset value as well as the predicted error absolute value sums have an extreme value at the boundary timing of the two frame images.

Accordingly, since the computer functions so as to detect generation of the image change between the two consecutive frame images when the in-frame distribution values of each of the frame images are larger than a set value as well as the predicted error absolute value sums have an extreme value at the boundary timing thereof, the image change can be detected further certainly and accurately.

BRIEF DESCRIPTION OF THE DRAWINGS

FIG. 1($a$) is a graph showing the change with a scene change generated from a complicated frame image with a large information amount to a simple frame image with a small information amount; and FIG. 1($b$) is a graph showing the change with a scene change generated from a simple frame image with a small information amount to a complicated frame image with a large information amount.

DESCRIPTION OF THE PREFERRED EMBODIMENTS

Now, preferable embodiments of the present invention will be explained with reference to the drawings. The embodiments explained below are embodiments in which the present invention is applied to the above-mentioned scene change detection in an encoding apparatus for encoding by the MPEG method.

(I) Principle of the Present Invention

Prior to the specific description of the embodiments of the present invention, the principle of the present invention will be explained with reference to FIGS. 1($a$) and 1($b$).

Figure 1A:
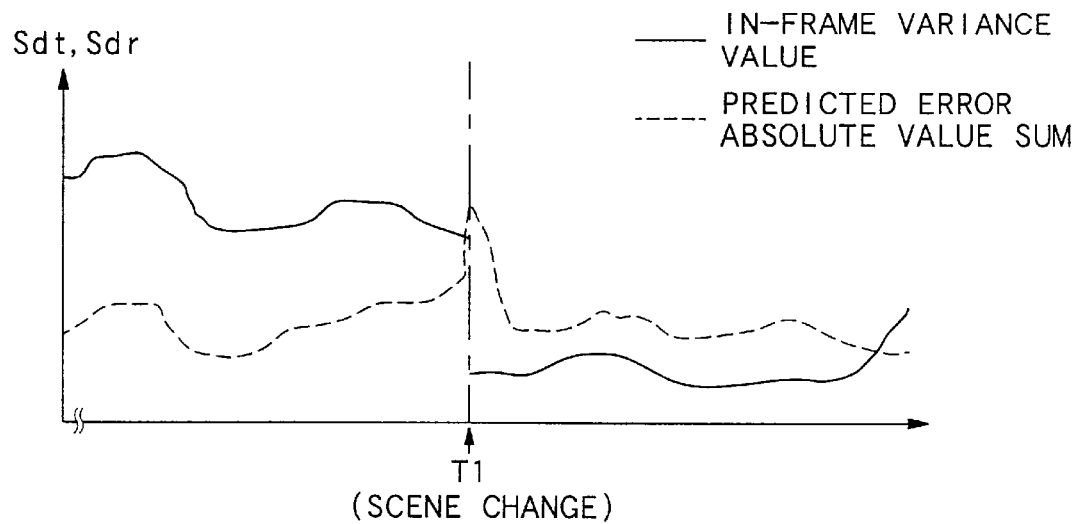
FIGS. 1($a$) and 1($b$) are graphs showing the changes of the predicted error absolute value sums and the change of the in-frame distribution values at the time of a scene change.
Figure 1B:
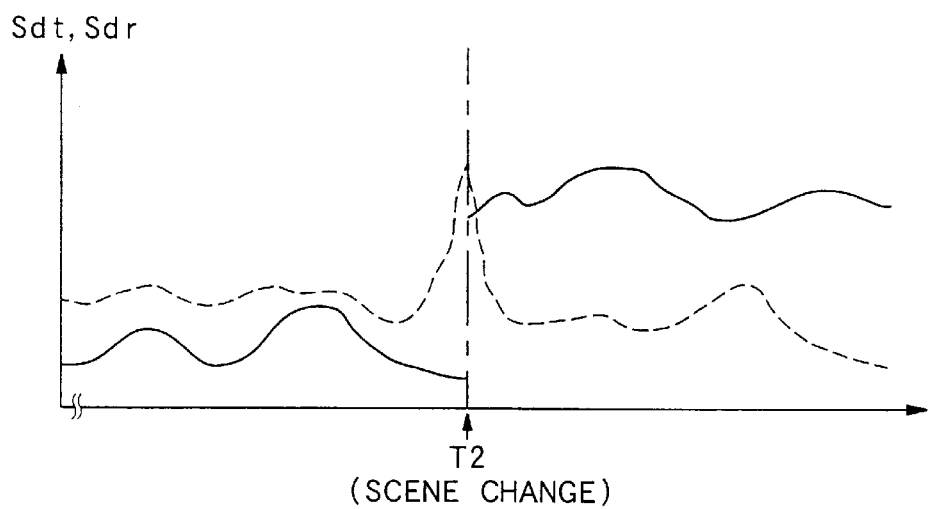

FIGS. 1($a$) and 1($b$) are graphs showing the changes of the so-called predicted error absolute value sums (distribution) and the change of the in-frame distribution values (distortion) in the case a scene change accompanying the change of a parameter in an encoding process of the MPEG method (hereinafter referred to as an encoding parameter) occurs in the moving picture information to be encoded; FIG. 1($a$) shows the change in the case a scene change is generated from a complicated frame image with a large information amount to a simple frame image with a small information amount at a boundary timing (time) $T_1$; and FIG. 1($b$) shows the change in the case a scene change is generated from a simple frame image with a small information amount to a complicated frame image with a large information amount at a boundary timing (time) $T_2$.

Here, the above-mentioned predicted error absolute value sum is a value obtained by adding the absolute value of the error of the luminance of the pixel designated by the movement vector obtained as a result of the movement prediction by the MPEG method (the luminance of the pixel predicted to be same as the luminance of the pixel at the starting point of the movement vector) and the actual luminance of the pixel for all the pixels in a frame image. It represents the frequency of the change among a plurality of frame images (change of the displayed objects included in a frame image (such as the cloud in a frame image showing the sky)).

At the time, in a scene change without the need of the above-mentioned encoding parameter change, the size difference is not generated between the luminance of the pixel designated by the movement vector as a result of the movement prediction and the actual luminance of the pixel.

In contrast, in a scene change with a remarkable information amount change that requires the encoding parameter change, as each shown in FIGS. 1($a$) and 1($b$), it is observed that the in-frame distribution value is changed stepwise, and the predicted error absolute value sum has an extreme value different from that of the case without generation of a scene change.

Accordingly, in the present invention, by monitoring both the change of the in-frame distribution value and the change of the predicted error absolute value sum, generation of a scene change that requires the change of an encoding parameter is detected at a timing when the in-frame distribution value is changed stepwise and the predicted error absolute value sum has an extreme value so that the encoding parameter is changed for the frame images immediately thereafter.

(II) Embodiments

Now, embodiments of the present invention will be explained specifically with reference to FIGS. 2 to 6.

Figure 2:
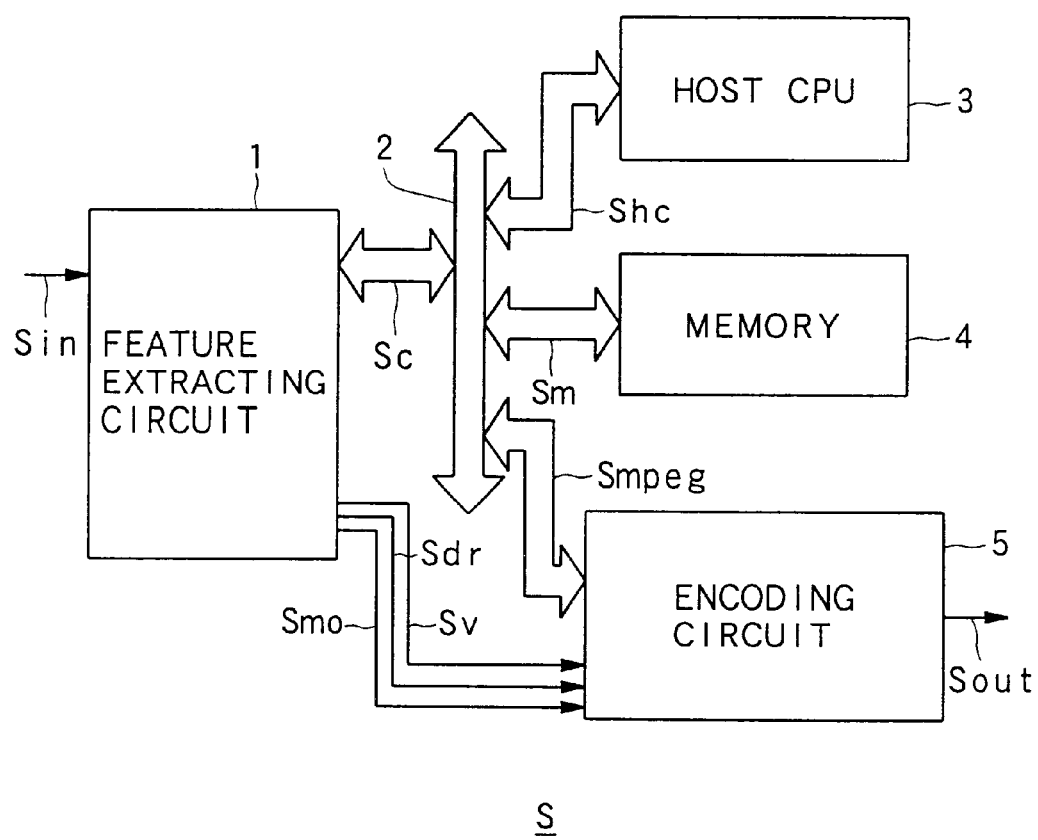
FIG. 2 is a block diagram showing the schematic configuration of an encoding apparatus according to an embodiment of the present invention.
Figure 3:
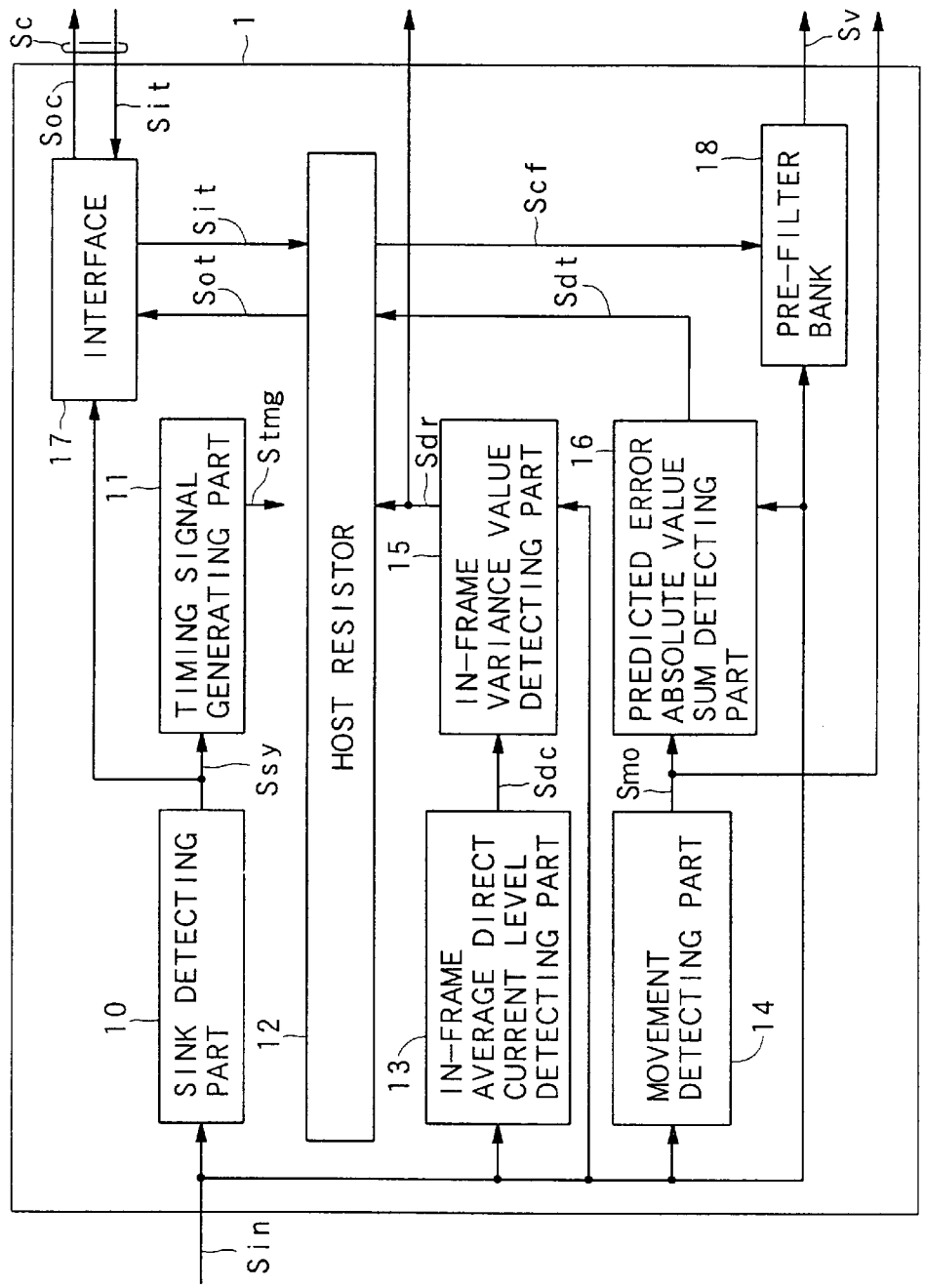
FIG. 3 is a block diagram showing the schematic configuration of a feature extracting circuit according to the embodiment.
Figure 4:
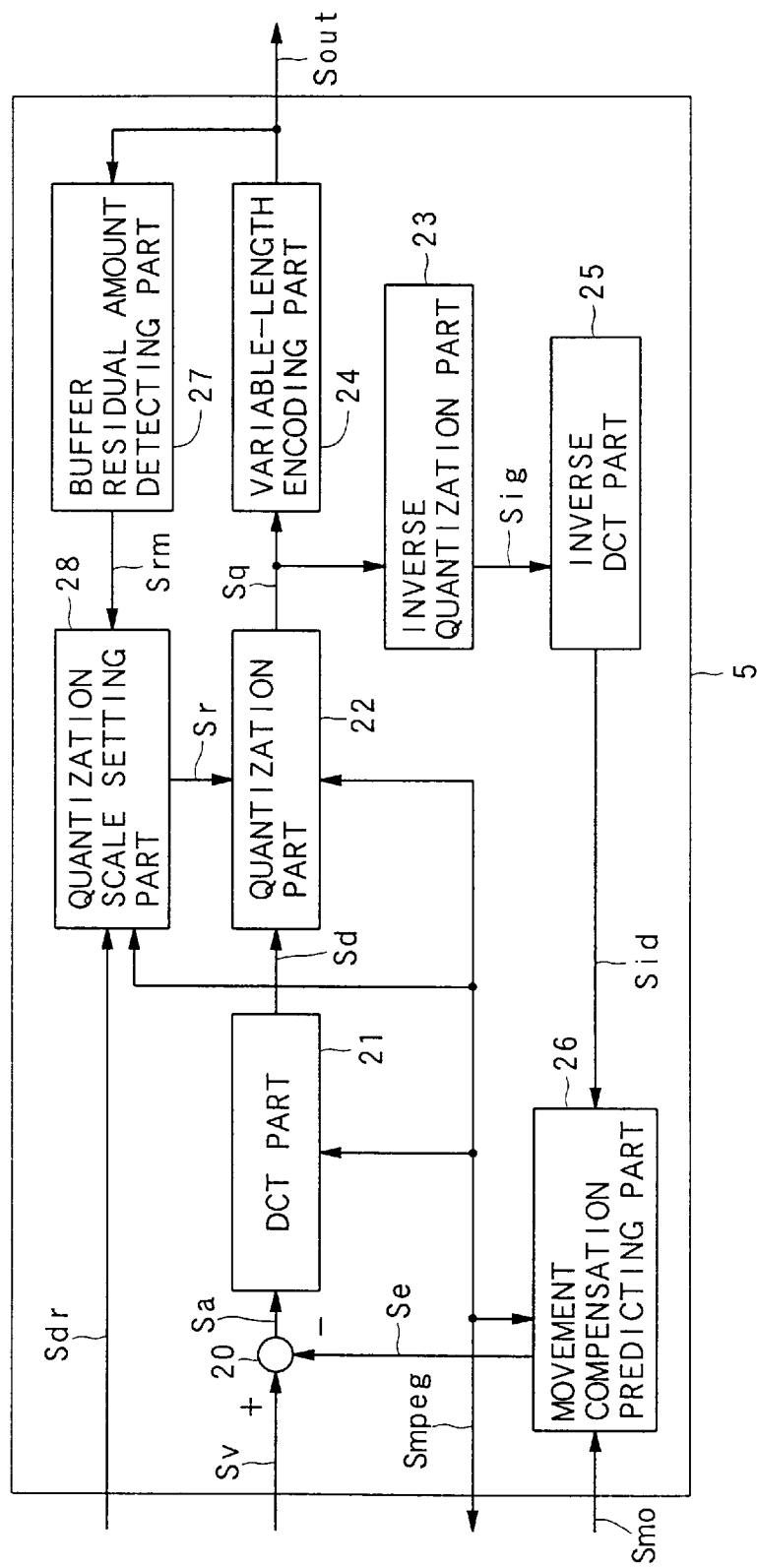
FIG. 4 is a block diagram showing the schematic configuration of an encoding circuit according to the embodiment.
Figure 5:
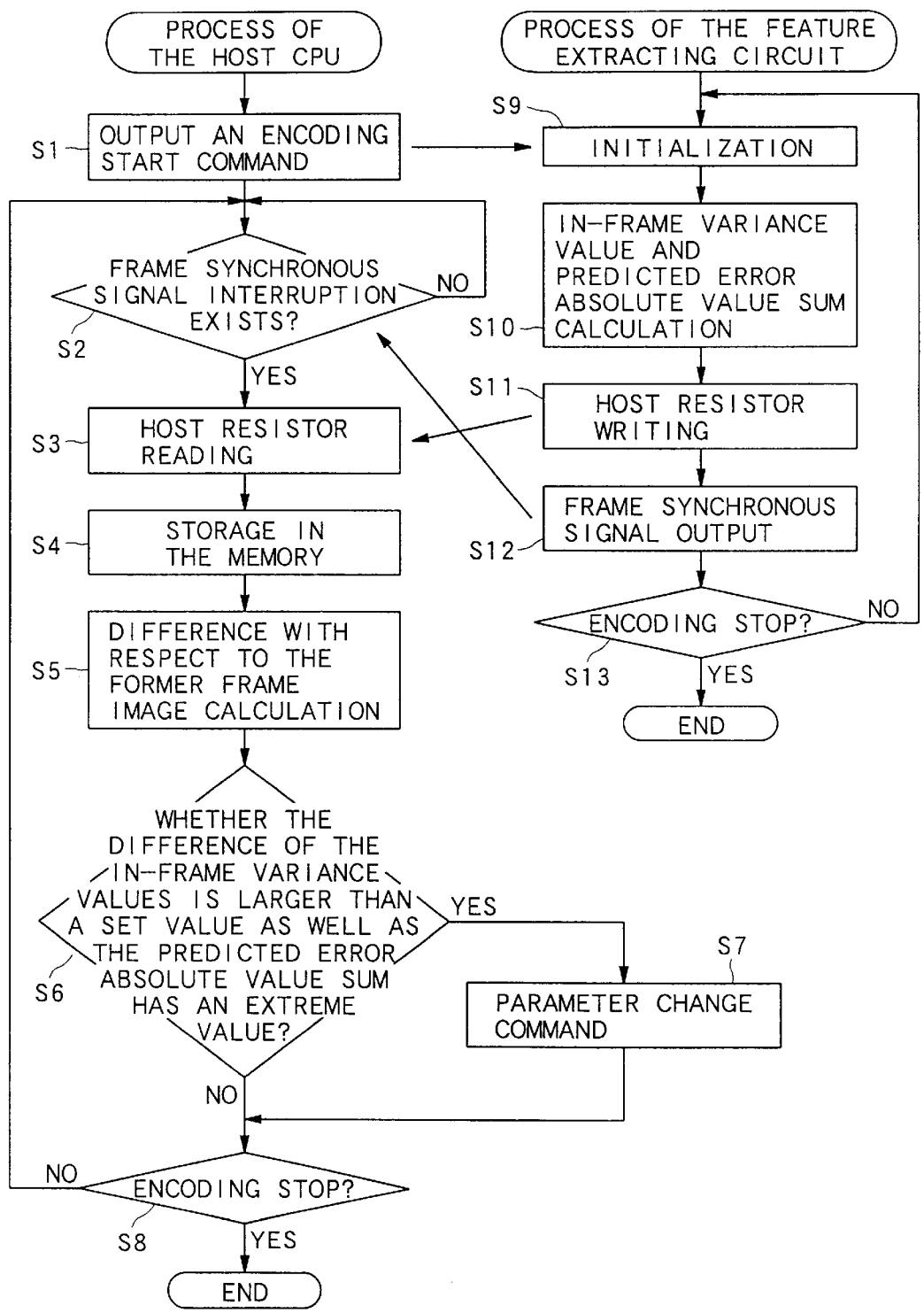
FIG. 5 is a flow chart showing an encoding process according to the embodiment.
Figure 6:
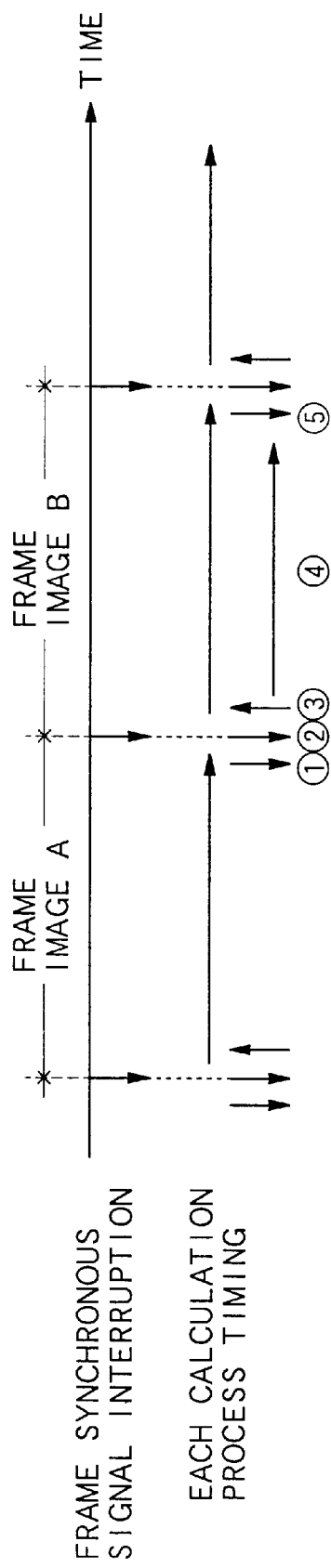
FIG. 6 is a timing chart showing an encoding process according to the embodiment.

FIG. 2 is a block diagram showing the schematic configuration of an encoding apparatus according to an embodiment of the present invention. FIG. 3 is a block diagram showing the schematic configuration of a feature extracting circuit according to the embodiment. FIG. 4 is a block diagram showing the schematic configuration of an encoding circuit according to the embodiment. FIG. 5 is a flow chart showing an encoding process according to the embodiment. FIG. 6 is a timing chart showing an encoding process according to the embodiment.

First, the entire configuration and the operation of the encoding apparatus according to the embodiment will be explained with reference to FIG. 2.

As shown in FIG. 2, an encoding apparatus S according to the embodiment comprises a feature extracting circuit 1, a bus 2, a host CPU 3 as a detecting device, a memory 4, and an encoding circuit 5 in the MPEG method as an encoding device.

Next, the schematic operation will be explained.

The feature extracting circuit 1 detects the in-frame distribution value and the predicted error absolute value sum of each frame image included in the moving picture information Sin to be encoded, inputted from the outside for each frame image while trading the control information Sc with the host CPU 3 via the bus 2 so as to output the same as a control signal Sc to the host CPU 3 via the bus 2.

At the same time, the feature extracting circuit 1 applies a movement detecting process by the MPEG method on the moving picture information Sin so as to produce a movement detecting signal Smo including the movement vector as a result thereof and output the same to the encoding circuit 5 as well as outputs the above-mentioned detected in-frame distribution value as a distribution value signal Sdr to the encoding circuit 5, and furthermore, applies a filtering process optimum to the encoding process in the encoding circuit 5 to the moving picture information Sin so as to produce an image filter signal Sv and output the same to the encoding circuit 5.

Accordingly, the encoding circuit 5 encodes the moving picture included in the image filter signal Sv, using the above-mentioned movement detecting signal Smo and distribution value signal Sdr while trading a control signal Smpeg with the host CPU 3 via the bus 2 so as to output the same as an output signal Sout to the outside.

Thereafter, the outputted output signal Sout is provided for the modulation process, for example, for recording on an optical disc, broadcast, or the like.

In these processes, the host CPU 3 controls the above-mentioned series of encoding processes comprehensively while trading a control signal Shc with the other component members via the bus 2.

At the time, the in-frame distribution value and the predicted error absolute value sum of each frame image included in the control signal Sc form the above-mentioned feature extracting circuit 1 are outputted to the host CPU 3 as the control signal Shc so that the host CPU 3 detects generation of the above-mentioned scene change (scene change that requires change of the encoding parameter in the encoding circuit 5) in the moving picture information Sin based thereon. Based on the detection result, the host CPU 3 controls the change of the encoding parameter in the encoding circuit 5, the pass band of the above-mentioned filtering process in the feature extracting circuit 1, and the like.

As needed according to the above-mentioned comprehensive control, the host CPU 3 stores necessary information in the memory 4 temporarily while trading a memory signal Sm with the memory 4 via the bus 2.

Next, the detailed configuration and the operation of the feature extracting circuit 1 will be explained with reference to FIG. 3.

As shown in FIG. 3, the feature extracting circuit 1 according to the embodiment comprises a sink detecting part 10, a timing signal generating part 11, a host resistor 12, an in-frame average direct current level detecting part 13, a movement detecting part 14, an in-frame distribution value detecting part 15 as a distribution value detecting device, a predicted error absolute value sum detecting part 16 as an absolute value sum detecting device, an interface 17, and a pre-filter bank 18.

Now, the operation will be explained.

First, moving picture information Sin inputted in the feature extracting circuit 1 is outputted to each of the sink detecting part 10, the in-frame average direct current level detecting part 13, the movement detecting part 14, the in-frame distribution value detecting part 15, the predicted error absolute value sum detecting part 16, and the pre-filter bank 18.

Accordingly, the sink detecting part 10 detects a horizontal synchronous signal and a vertical synchronous signal in the moving picture information Sin, respectively so as to output the same to the interface 17 and the host CPU 3 via the bus 2 as a frame synchronous signal Ssy by the timing described later as well as to the timing signal generating part 11.

Then, the timing signal generating part 11 produces a timing signal Stmg to be the reference for the operation of each component member comprising the feature extracting circuit 1 based on the frame synchronous signal Ssy so as to output the same to the component members.

In contrast, the in-frame average direct current level detecting part 13 to which the moving picture information Sin is inputted detects the average value in the entire frame image, of the luminance of each pixel included in a frame image per each frame image in the moving picture information Sin (that is, the in-frame average direct current level) so as to output the same as an average value signal Sdc to the in-frame distribution value detecting part 15.

Accordingly, the in-frame distribution value detecting part 15 detects the above-mentioned in-frame distribution value for each frame image by detecting the difference between the luminance in each pixel included in a frame image and the average value of the luminance included in the average value signal Sdc, using the average value signal Sdc and the moving picture information Sin so as to output the same as the above-mentioned distribution value signal Sdr to the host resistor 12 and the above-mentioned encoding circuit 5 by the timing described later.

In contrast, the movement detecting part 14 to which the movement picture information Sin is inputted detects the movement vector per each macro block included therein based on the MPEG method for each frame image in the moving picture information Sin so as to output the same as the above-mentioned movement detecting signal Smo to the predicted error absolute value sum detecting part 16 by the timing described later as well as to the encoding circuit 5.

Accordingly, the predicted error absolute value sum detecting part 16 detects the above-mentioned predicted error absolute value sum for each frame image by adding the absolute value of the error of the luminance of the pixel designated by each movement vector and the actual luminance of the pixel for all the pixels in a frame image based on the movement detecting signal Smo and the moving picture information Sin so as to output the same as an absolute value sum signal Sdt to the host resistor 12 by the timing later described.

Then, the host resistor 12 temporarily stores the in-frame distribution value included in the above-mentioned distribution value signal Sdr and the predicted error absolute value sum included in the absolute value sum signal Sdt, respectively so as to output the same as a resistor output signal Sot to the interface 17 by the timing described later.

Accordingly, the interface 17 applies a preset predetermined interface process to the resistor output signal Sot so as to output the same as a resistor output signal Sot comprising the above-mentioned control signal Sc to the host CPU 3 via the bus 2.

In contrast, a resistor input signal Sit including a band control signal Scf described later, for controlling the pass band of the pre-filter bank 18 outputted from the host CPU 3 is applied with the above-mentioned interface process in the interface 17 so as to be stored temporarily in the host resistor 12. Among them, the band control signal Scf is outputted from the host resistor 12 to the pre-filter bank 18 by the timing later described so as to be used for controlling the pass band of the pre-filter bank 18.

Thereby, the pre-filter bank 18 passes the information corresponding to the pass band among the moving picture information Sin so as to produce the above-mentioned image filter signal Sv and output the same to the encoding circuit 5.

Next, the detailed configuration and the operation of the encoding circuit 5 will be explained with reference to FIG. 4.

As shown in FIG. 4, the encoding circuit 5 comprises an adder 20, a DCT part 21, a quantization part 22, an inverse quantization part 23, a variable-length encoding part 24, an inverse DCT part 25, a movement compensation predicting part 26, a buffer residual amount detecting part 27, and a quantization scale setting part 28.

Now, the operation will be explained.

The adder 20 to which the above-mentioned image filter signal Sv is inputted subtracts a compensation signal Se outputted from the movement compensation predicting part 26 from the image filter signal Sv so as to output the same as a subtraction signal Sa to the DCT part 21.

Then, the DCT part 21 applies a DCT process for the information amount compression on the subtraction signal Sa by a known technique so as to output the same as a conversion signal Sd to the quantization part 22.

Then, the quantization part 22 quantizes the conversion signal Sd so as to match a bit rate represented by a rate signal Sr described later for producing a quantization signal Sq to be outputted to the variable-length encoding part 24 and the inverse quantization part 23.

Then, the inverse quantization part 23 applies an inverse quantization process to the quantization signal Sq so as to produce an inverse quantization signal Sig and output the same to the inverse DCT part 25.

Then, the inverse DCT part 25 applies an inverse DCT (inverse discrete cosine transform) process to the inverse quantization signal Sig by a known technique so as to output the same as an inverse conversion signal Sid to the movement compensation predicting part 26.

Thereafter, the movement compensation predicting part 26 executes a movement compensation process using the so-called inter-frame prediction in the MPEG method based on the movement vector and the inverse conversion signal Sid included in the above-mentioned movement detecting signal Smo from the feature extracting circuit 1 so as to produce the above-mentioned compensation signal Se for the information amount compression and output the same to the adder 20.

In contrast, the variable-length encoding part 24 applies a variable-length encoding process to the above-mentioned quantization signal Sq so as to output an output signal Sout as a signal obtained by compression encoding of the original image filter signal Sv by the MPEG method to the buffer residual amount detecting part 27 and the outside.

At the time, the buffer residual amount detecting part 27 predicts and detects the residual amount of the buffer memory to be used at the time of reproducing the moving picture information applied with the above-mentioned compression encoding included in the output signal Sout based on the output signal Sout so as to produce a residual amount signal Srm and output the same to the quantization scale setting part 28.

Thereby, the quantization scale setting part 28 produces the above-mentioned rate signal Sr for controlling the bit rate in the quantization process so as to have the information amount of the above-mentioned output signal Sout as a result of the quantization process in the quantization part 22 to the extent of not overflowing or underflowing the above-mentioned buffer memory based on the above-mentioned residual amount signal Srm while using the in-frame distribution value included in the distribution value signal Sdr from the feature extracting circuit 1 as the so-called activity so as to output the same to the quantization part 22.

In the above-mentioned operation of the encoding circuit 5, the DCT part 21, the quantization part 22, the variable-length encoding part 24 and the movement compensation predicting part 26 each execute the compression encoding by optimizing the encoding parameter while trading the above-mentioned control signal Smpeg with the host CPU 3 via the bus 2.

Now, the encoding process including the scene change detecting process according to the present invention will be explained with reference to FIGS. 5 and 6.

FIG. 5 shows the process of the feature extracting circuit 1 and the process of the host CPU 3 in the encoding process parallel.

As shown in FIG. 5, in the encoding process of the embodiment, first, when an encoding start command for starting the encoding process is outputted from the host CPU 3 to each component member via the bus 2 (Step S1), the feature extracting circuit 1 receiving the same initializes the in-frame distribution value detecting part 15, the predicted error absolute value sum detecting part 16 and the host resistor 12 (Step S9).

Then, in the feature extracting circuit 1, the in-frame distribution value and the predicted error absolute value sum in the frame image inputted immediately before as the moving picture information Sin (frame image A in FIG. 6) are detected, using the in-frame distribution value detecting part 15 after the initialization, the predicted error absolute value sum detecting part 16, the in-frame average direct current level detecting part 13, and the movement detecting part 14 (Step S10). The process of the Step S10 is executed in the timing (1) of FIG. 6 with the above-mentioned immediately before frame image A as the subject.

When the in-frame distribution value and the predicted error absolute value sum are detected, the detection result is written in the host resistor 12 in the feature extracting circuit 1 (Step S11). Thereafter, at the timing (2) of FIG. 6, the above-mentioned frame synchronous signal Ssy showing the input timing of the frame image to be inputted after the frame image A, whose in-frame distribution value and the predicted error absolute value sum are detected, (frame image B in FIG. 6) is outputted to the host CPU 3 via the bus 2 (Step S12).

Whether or not the control signal Sc for stopping the encoding operation is received from the host CPU 3 is confirmed (Step S13). If it is received (Step S13; YES), the feature extracting process is ended. In contrast, if it is not received, the operation is returned to the Step S9 for executing the above-mentioned process at Steps S9 to S12 with the frame image B to be inputted next as the subject.

On the other hand, after outputting the encoding start command at Step S1, the host CPU 3 always monitors whether or not the above-mentioned frame synchronous signal Ssy is outputted from the feature extracting circuit 1 (Step S2). If the signal is not outputted (Step S2; NO), it awaits until the output. In contrast, if the signal is outputted (Step S2; YES), the in-frame distribution value and the predicted error absolute value sum recorded in the host resistor 12 are read out at the timing (3) of FIG. 6 (Step S3) so that the content thereof is stored in the memory 4 as a memory signal Sm (Step S4).

The in-frame distribution value and the predicted error absolute value sum detected and read out for the frame image immediately before the frame image A in FIG. 6 are stored in the memory 4.

Then, the difference between the newly detected in-frame distribution value and predicted error absolute value sum, and the in-frame distribution value and predicted error absolute value sum stored immediately before is calculated (Step S5).

Based on the calculated difference, whether or not the difference between the two in-frame distribution values is larger than a value preset by experience (capable of judging the scene change) as well as whether or not the change of the predicted error absolute value sum based on the two predicted error absolute value sums has an extreme value are judged by the host CPU 3 (Step S6).

At the time, the process at Steps S4 to S6 is executed in the period (4) shown in FIG. 6.

Then, as a result of the judgment at Step S6, in the case the difference of the two in-frame distribution values is larger than the preset value as well as the change of the predicted error absolute value sum has an extreme value (Step S6; YES), it is judged that a scene change that requires the change of the encoding parameter for the encoding process in the encoding circuit 5 occurs so that the encoding circuit 5 is controlled by the control signal Smpeg so as to optimize the encoding parameter (Step S7), and moves to the Step S8.

The encoding parameter changing process is executed at the timing (5) of FIG. 6 (at the time, at the timing (5), the above-mentioned process of the Step S10 with the frame image B as the subject in FIG. 6 is executed simultaneously).

In contrast, as a result of the judgment at Step S6, in the case either the difference of the two in-frame distribution values is not larger than the set value or the change of the predicted error absolute value sum does not have an extreme value (Step S6; NO), it is judged that a scene change that requires the change of the encoding parameter does not occur so that the change is not executed. Then, whether or not the encoding process is to be stopped by a reason, such as the operation for stopping the encoding process is executed by an unillustrated operation part is judged (Step S8). Then, in the case the encoding process is to be continued, (Step S8; NO), it is returned to the Step S2 for executing the above-mentioned process with the frame image to be inputted next as the subject. On the other hand, in the case of stopping the encoding process (Step S8; YES), the control signal Sc therefor is outputted to the feature extracting circuit 1 so as to end the series of the encoding process.

As heretofore explained, according to the scene change detecting process in the encoding process of this embodiment, since whether or not occurrence of the image change is detected based on the change of the in-frame distribution values between two consecutive frame images and the change of the predicted error absolute value sums at the boundary timing, the image change influencing encoding can be detected certainly and accurately.

Moreover, since generation of the image change between the two consecutive frame images is detected in the case the in-frame distribution values of each of the frame images are larger than a set value as well as the predicted error absolute value sums have an extreme value at the boundary timing thereof, the image change can be detected further certainly and accurately.

Furthermore, since the scene change is detected certainly and the encoding parameter is changed at the scene change timing, the moving picture information Sin can be encoded further accurately with the noises reduced.

(III) Modified Embodiment

Next, a modified embodiment according to the present invention will be explained.

In the above-mentioned embodiment, only whether or not occurrence of the scene change is detected by detecting only whether or not the difference between the two in-frame distribution value is larger than the above-mentioned set value as well as the change of the predicted error absolute value sum has an extreme value at Step S6. In addition thereto, by detecting the size relationship of the two in-frame distribution values to be compared at Step S6, the orientation of the encoding parameter change at Step S7, that is, whether the encoding parameter is to be changed in order to cope with a scene change with the information amount to be increased (a scene change from a simple frame image to a complicated frame image), or the encoding parameter is to be changed in order to cope with a scene change with the information amount to be reduced (a scene change from a complicated frame image to a simple frame image) can be detected.

Specifically, at Step S6 of FIG. 5, in addition to the judgment on whether or not the difference between the two in-frame distribution values is larger than the set value as well as the change of the predicted error absolute value sum has an extreme value is judged, the size relationship of the in-frame distribution value newly detected and the in-frame distribution value stored immediately before is judged. In the case the newly detected in-frame distribution value is larger than the in-frame distribution value stored immediately before, it is judged to be a scene change with the information amount increased. In the case the newly detected in-frame distribution value is smaller than the in-frame distribution value stored immediately before, it is judged to be a scene change with the information amount reduced. Accordingly, the above-mentioned encoding parameter change orientation can be judged at the same time.

According to the modified embodiment, since generation of a scene change with the information amount reduced is detected in the case the in-frame distribution value in the former frame image is larger than the in-frame distribution value in the latter frame image concerning two consecutive frame images, a scene change with the information amount reduced in the two frame images can be detected further certainly and accurately.

Moreover, since generation of a scene change with the information amount increased is detected in the case the in-frame distribution value in the former frame image is smaller than the in-frame distribution value in the latter frame image, a scene change with the information amount increased in the two frame images can be detected further certainly and accurately.

Although the cases in which the present invention is applied to detection of a scene change in an encoding process of the MPEG method have been explained in the above-mentioned embodiment and modified embodiment, in addition to that, the present invention can also be applied for providing as the thumb nail image, a frame image immediately after a scene change detected by the present invention in the case of producing a so-called thumb nail image (a typical frame image characterizing the entirety of a series of the moving picture information) at the time of an input of general moving picture information (for example, input of moving picture information into a personal computer).

Moreover, by recording a program corresponding to the flow chart shown in FIG. 5 in an information recording medium such as a flexible disc and a hard disc, and reading out the same by a personal computer, or the like for the execution, the personal computer can be utilized as the above-mentioned host CPU 3.

According to the other aspect of the present invention, since an image change can be detected certainly and an encoding parameter is changed at the image change timing, the moving picture information can be encoded further accurately with the noises reduced.

According to the other aspect of the present invention, since whether or not occurrence of the image change is detected based on the change of the in-frame distribution values between two consecutive frame images and the change of the predicted error absolute value sums at the boundary timing, the image change influencing encoding can be detected certainly and accurately.

The entire disclosure of Japanese Patent Application No. 2000-76324 filed on Mar. 14, 2000 including the specification, claims, drawings and summary is incorporated herein by reference in its entirety.

What is claimed is:

1. An image change detecting apparatus for detecting occurrence of an image change which takes place between two consecutive frame images as difference in image information amount included therein in moving picture information having a plurality of frame images, comprising:
a distribution value detecting device for detecting each in-frame distribution value of the frame images,
an absolute value sum detecting device for detecting each predicted error absolute value sum of the frame images, and
an image change detecting device for detecting whether or not the image change takes place between the two frame images based on change between the in-frame distribution values of the two consecutive frame images and on change of the predicted error absolute value sums at boundary timing of the frame images.

2. The image change detecting apparatus according to claim 1, wherein the image change detecting device judges that the image change takes place between the two consecutive frame images when the in-frame distribution values of the frame images are larger than a preset value as well as the predicted error absolute value sums have an extreme value at the boundary timing of the two frame images.

3. The image change detecting apparatus according to claim 2, wherein the image change detecting device judges that the image change due to reduction in information amount takes place between the two consecutive frame images when the in-frame distribution value of a prior one of the frame images is larger than the in-frame distribution value of a latter one of the frame images.

4. The image change detecting apparatus according to claim 2, wherein the image change detecting device judges that the image change due to increase in information amount takes place between the two consecutive frame images when the in-frame distribution value of a prior one of the frame images is smaller than the in-frame distribution value of the latter one of the frame images.

5. An image encoding apparatus comprising:
(i) an image change detecting apparatus for detecting occurrence of an image change which takes place between two consecutive frame images as difference in image information amount included therein in moving picture information having a plurality of frame images, comprising:
a distribution value detecting device for detecting each in-frame distribution value of the frame images,
an absolute value sum detecting device for detecting each predicted error absolute value sum of the frame images, and
an image change detecting device for detecting whether or not the image change takes place between the two frame images based on change between the in-frame distribution values of the two consecutive frame images and on change of the predicted error absolute value sums at boundary timing of the frame images; and
(ii) an encoding device for encoding moving picture by changing an encoding parameter for encoding the moving picture information after occurrence of the image change is detected.

6. The image encoding apparatus according to claim 5, wherein the image change detecting device of said image change detecting apparatus judges that the image change takes place between the two consecutive frame images when the in-frame distribution values of the frame images are larger than a preset value as well as the predicted error absolute value sums have an extreme value at the boundary timing of the two frame images.

7. The image encoding apparatus according to claim 6, wherein the image change detecting device judges that the image change due to reduction in information amount takes place between the two consecutive frame images when the in-frame distribution value of a prior one of the frame images is larger than the in-frame distribution value of a latter one of the frame images.

8. The image encoding apparatus according to claim 6, wherein the image change detecting device judges that the image change due to increase in information amount takes place between the two consecutive frame images when the in-frame distribution value of a prior one of the frame images is smaller than the in-frame distribution value of the latter one of the frame images.

9. An image change detecting method for detecting occurrence of an image change which takes place between two consecutive frame images as difference in image information amount included therein in moving picture information having a plurality of frame images, comprising:
a distribution value detecting process for detecting each in-frame distribution value in the frame images,
an absolute value sum detecting process for detecting each predicted error absolute value sum of the frame images, and
an image change detecting process for detecting whether or not the image change takes place between the two frame images based on change between the in-frame distribution values of the two consecutive frame images and on change of the predicted error absolute value sums at boundary timing of the frame images.

10. The image change detecting method according to claim 9, wherein the image change detecting process judges that the image change takes place between the two consecutive frame images when the in-frame distribution values of the frame images are larger than a preset value as well as the predicted error absolute value sums have an extreme value at the boundary timing of the two frame images.

11. An information recording medium with an image change detecting program recorded readable by a computer, wherein the program causes the computer, which is included in an image change detecting apparatus for detecting occurrence of an image change which takes place between two consecutive frame images as difference in image information amount included therein in moving picture information having a plurality of frame images, to function as:

a distribution value detecting device for detecting each in-frame distribution value of the frame images;

an absolute value sum detecting device for detecting each predicted error absolute value sum of the frame images; and an image change detecting device for detecting whether or not the image change takes place between the two frame images based on change between the in-frame distribution values of the two consecutive frame images and on change of the predicted error absolute value sums at boundary timing of the frame images.

12. The information recording medium with the image change detecting program recorded according to claim 11, wherein the program causes the computer functioning as the image change detecting device to function to make a judgement that the image change takes place between the two consecutive frame images when the in-frame distribution values of the frame images are larger than a preset value as well as the predicted error absolute value sums have an extreme value at the boundary timing of the two frame images.

* * * * *